United States Patent [19]

McCartney et al.

[11] Patent Number: 4,941,063
[45] Date of Patent: * Jul. 10, 1990

[54] TELEPHONE LINES OVERVOLTAGE PROTECTION APPARATUS

[75] Inventors: Thomas McCartney, Bannockburn; Melvin A. Lace, Prospect Heights, both of Ill.

[73] Assignee: Oneac Corporation, Libertyville, Ill.

[ * ] Notice: The portion of the term of this patent subsequent to Jul. 19, 2005 has been disclaimed.

[21] Appl. No.: 341,771

[22] Filed: Apr. 20, 1989

Related U.S. Application Data

[63] Continuation-in-part of Ser. No. 164,244, Mar. 4, 1988, abandoned.

[51] Int. Cl.$^5$ .............................................. H02H 9/04
[52] U.S. Cl. ..................................... 361/119; 361/91; 361/111; 379/412
[58] Field of Search ................... 361/56, 91, 111, 118, 361/119, 120, 126, 127, 54; 379/412, 331

[56] References Cited

U.S. PATENT DOCUMENTS

| | | | |
|---|---|---|---|
| 3,571,658 | 3/1971 | Knoth | 361/40 |
| 3,725,613 | 4/1973 | Allen et al. . | |
| 3,852,539 | 12/1974 | DeLuca . | |
| 3,944,753 | 3/1976 | Proctor et al. . | |
| 3,950,676 | 4/1976 | Dornseifer et al. | 361/40 |
| 3,961,227 | 6/1976 | DeLuca et al. . | |
| 4,039,763 | 8/1977 | Angner et al. . | |
| 4,079,211 | 3/1978 | Janssen . | |
| 4,095,163 | 6/1978 | Montague | 323/8 |
| 4,156,838 | 5/1979 | Montague | 323/8 |
| 4,203,006 | 5/1980 | Mascia | 179/2 C |
| 4,254,442 | 3/1981 | Dijkmans et al. | 361/56 |
| 4,455,586 | 6/1984 | McCartney | 361/91 X |
| 4,491,903 | 1/1985 | Montague | 363/48 |
| 4,536,618 | 8/1985 | Serrano . | |
| 4,539,617 | 9/1985 | Delaney et al. | 361/58 |
| 4,544,983 | 10/1985 | Anderson et al. | 361/119 |
| 4,586,104 | 4/1986 | Standler | 361/91 |
| 4,591,666 | 5/1986 | Boeckmann . | |
| 4,729,055 | 3/1988 | Dorival | 361/119 |
| 4,758,920 | 3/1987 | McCartney | 361/119 |
| 4,764,956 | 8/1988 | Rosch et al. | 379/412 |

FOREIGN PATENT DOCUMENTS

| | | |
|---|---|---|
| 0186873 | 7/1986 | European Pat. Off. . |
| 1513038 | 8/1971 | Fed. Rep. of Germany . |
| 2334698 | 1/1975 | Fed. Rep. of Germany . |

*Primary Examiner*—Todd E. DeBoer
*Attorney, Agent, or Firm*—Mason, Kolehmainen, Rathburn & Wyss

[57] ABSTRACT

Overvoltage protection arrangements are provided for a pair of telephone lines effective for suppressing noise and transient voltage signals occurring above data and voice signals carried on the telephone lines and that avoids current flow between the telephone lines responsive to common mode voltage signals on the lines so that audible hum is avoided. The overvoltage protection arrangements include first voltage clamping circuitry for clamping voltage signals on the lines at a first predetermined voltage potential and second voltage clamping and filter circuitry for clamping voltage signals on the lines at a second predetermined voltage potential and for filtering noise and transient signals from the voltage signals only when the voltage signals exceed the second predetermined voltage potential. The second voltage clamping circuitry substantially avoids current flow between the lines responsive to common mode voltage signals on the lines.

13 Claims, 2 Drawing Sheets

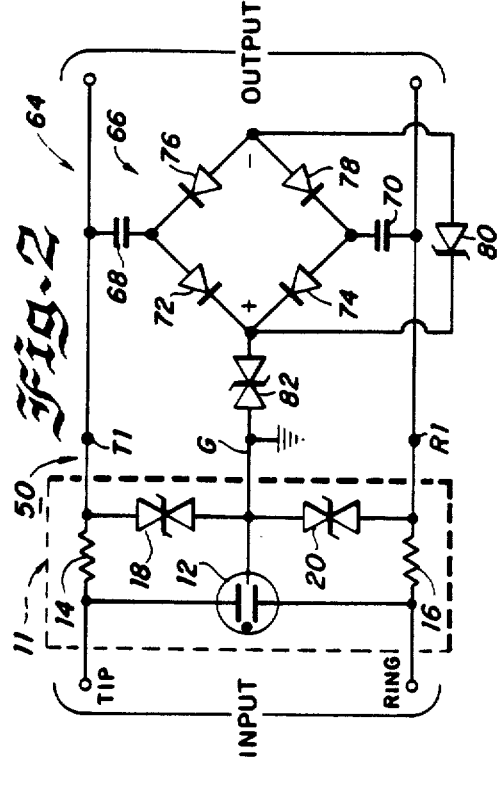
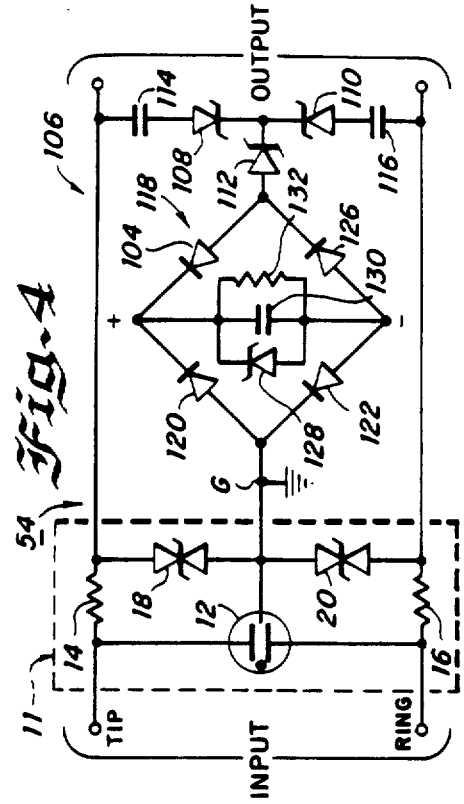
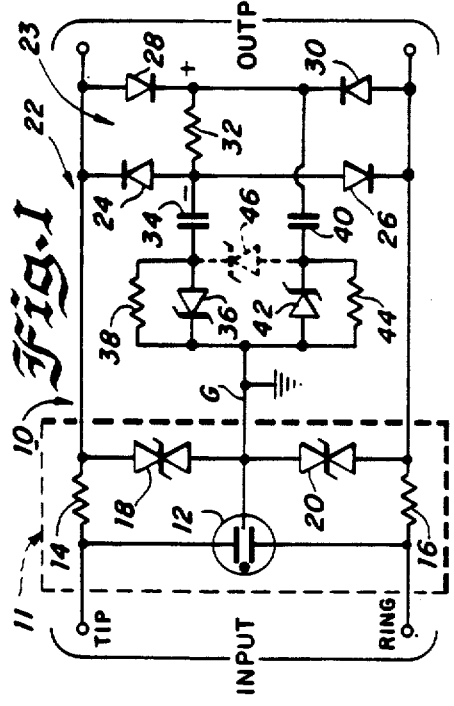
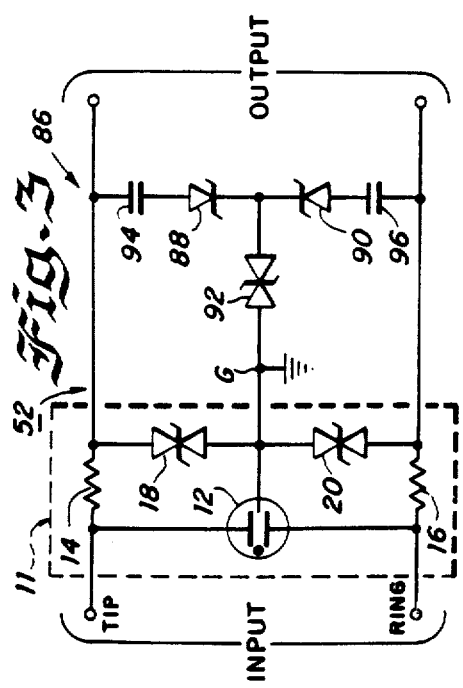

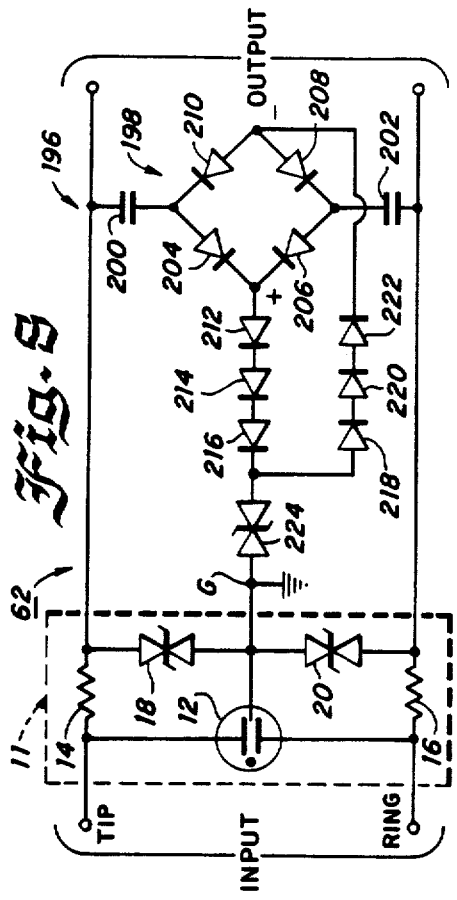
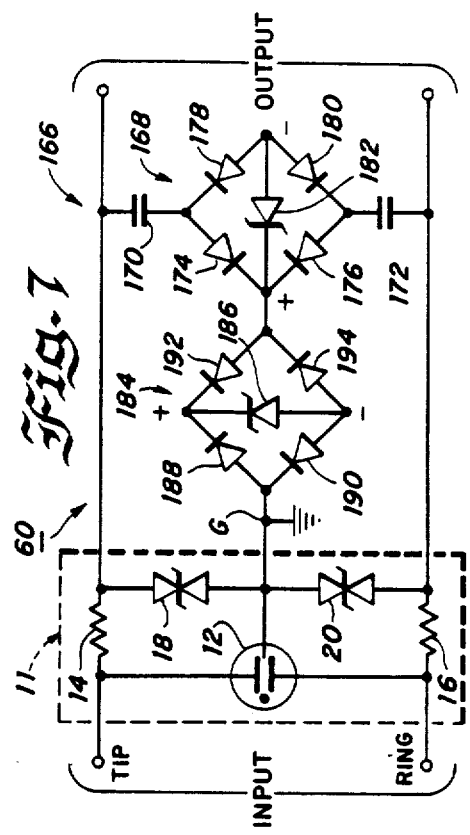
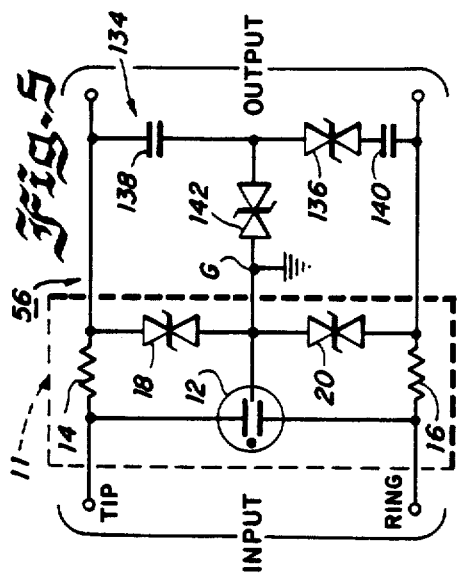
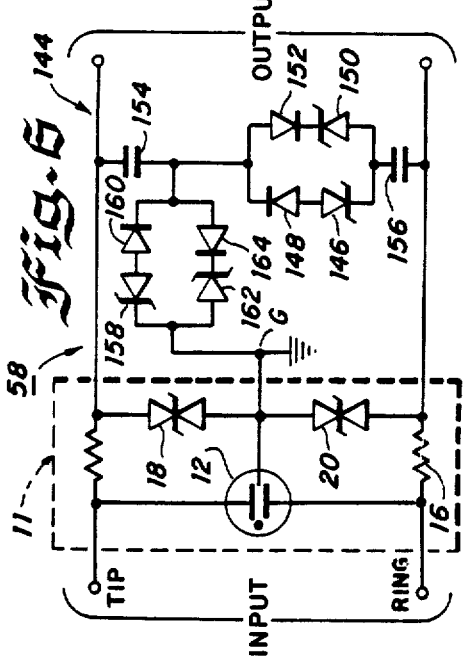

TELEPHONE LINES OVERVOLTAGE PROTECTION APPARATUS

RELATED UNITED STATES PATENT APPLICATION

The present application is a continuing application of U.S. patent application Ser. No. 164,244, filed March 4, 1988 now abandoned.

BACKGROUND OF THE INVENTION

1. Field of the Invention

This invention relates generally to an overvoltage protection circuit for a pair of telephone lines and more particularly, to circuitry for filtering noise and transient voltage signals above data signals on a pair of telephone lines.

2. Prior Art

Various arrangements have been used for protecting telephone equipment against hazardous voltages due to lightning or power surges. However, conventional arrangements are effective for clamping transient voltages at a rated potential above the ring signal of conventional telephone systems. The typical ring signal is about 170 volts AC peak with a frequency between 15 and 30 hertz so that the conventional arrangements have a rated clamping voltage of approximately 200 volts. Consequently, such arrangements are ineffective for filtering noise and transient voltage signals occurring below this standard clamping voltage.

Overvoltage protection circuitry that overcomes many of the disadvantages of the prior art is disclosed in McCartney, U.S. Pat. No. 4,758,920, issued July 19, 1988 and assigned to the same assignee of the present invention.

Known protection circuitry generally effective for normal mode overvoltage noise and transient protection can produce a differential current flow in the lines in response to common mode induced voltages of the same phase and amplitude on both lines. Such differential current flow can result from a common mode dynamic unbalance in the protection circuitry and cause an audible hum. It is desirable to provide an overvoltage protection circuitry that avoids introducing any common mode dynamic unbalance differential current flow in the lines in response to common mode induced voltages or audible hum.

SUMMARY OF THE INVENTION

It is an object of the present invention to provide overvoltage protection circuitry that overcomes many of the disadvantages of the prior art systems.

It is another object of the present invention to provide an improved overvoltage protection apparatus for coupling a subscriber's station to a telephone system.

It is another object of the present invention to provide such apparatus that is effective for protecting subscriber's station equipment from hazardous voltages due to lightning, noise or power surges.

It is another object of the present invention to provide such apparatus that is effective for suppressing or minimizing noise and other transient voltage signals occurring below a predefined potential of a ring signal supplied by the telephone central office.

It is another object of the present invention to provide such apparatus further that substantially avoids current flow between the lines responsive to common mode voltage signals on the lines so that audible hum is avoided.

Therefore, in accordance with the preferred embodiments of the invention, there are provided overvoltage protection arrangements used with a pair of telephone lines. The overvoltage protection arrangements include first voltage clamping circuitry for clamping voltage signals on the lines at a first predetermined voltage potential and second voltage clamping and filter circuitry for clamping voltage signals on the lines at a second predetermined voltage potential and for filtering noise and transient signals from the voltage signals only when the voltage signals exceed the second predetermined voltage potential. The second voltage clamping circuitry substantially avoids current flow between the lines responsive to common mode voltage signals on the lines.

In accordance with an important feature of the invention, the overvoltage protection arrangements are effective for suppressing noise and transient voltage signals occurring above data and voice signals carried on the telephone lines and that avoids current flow between the telephone lines so that audible hum is avoided.

DESCRIPTION OF THE DRAWING

These and other objects and advantages of the present invention will become readily apparent upon consideration of the following detailed description and attached drawing wherein:

FIG. 1 is an electrical schematic representation of an overvoltage protection apparatus arranged in accordance with the principles of the present invention;

FIGS. 2-8 are electrical schematic representations of alternative overvoltage protection circuitry arranged in accordance with the principles of the present invention.

DETAILED DESCRIPTION OF THE PREFERRED EMBODIMENTS

Referring now to FIG. 1, there is illustrated an overvoltage protection circuit for telephone lines according to the invention generally designated by the reference numeral 10. At its INPUT, the overvoltage protection circuit 10 is connected to a pair of lines or TIP and RING conductors of a telephone system. A subscriber's station, such as a modem or telephone set is connected to the OUTPUT of the circuit 10.

Shown enclosed in dotted line of the overvoltage protection circuit 10 is first circuitry generally designated by the reference numeral 11 for clamping voltage signals on the TIP and RING conductors at a first predetermined voltage potential above the conventional ring signal. Voltage clamping circuitry 11 includes a gas discharge tube 12 or similar device that is connected between the TIP and RING conductors and to ground potential at ground line G. A resistor 14 is connected in series with the TIP line and a resistor 16 is connected in series with the RING line. A transient voltage suppressor 18 is connected between the resistor 14 and ground potential and a transient voltage suppressor 20 is connected between the resistor 16 and ground potential.

Voltage clamping circuitry 11 is effective for protecting the telephone equipment connected to the OUTPUT of circuit 10 from hazardous voltages, for example, due to lightning and power surges. The gas discharge tube 12 clamps transient voltages that appear both across the TIP and RING conductors with respect to the ground line G and provides a high impedance to the ground line G when a high voltage transient is not present. The transient voltage suppressors 18 and 20 conduct whenever the voltage potential applied to the TIP and RING lines, respectively, exceeds a predetermined breakdown voltage potential selected above the typical 170 volts AC ring signal, such as, for example 200 volts. Resistors 14 and 16 limit current to the transient voltage suppressors 18 and 20.

A three electrode gas discharge tube device such as, a Milli-Triac part number MLT0090, rated for a breakdown voltage of 600 volts, manufactured by Reynolds Industries may be employed for the gas discharge tube 12. Transient voltage suppressors of a type manufactured and sold by General Semiconductor Industries, Inc., a Square D Company under a registered trademark TransZorb, such as part number 1N6303A or 1.5KE250C rated for a reverse standoff voltage without conduction at 202 volts and for a breakdown voltage in a range between 225-275 volts, advantageously may be employed for suppressors 18 and 20.

Overvoltage protection circuit 10 includes second voltage clamping circuitry designated generally by the reference numeral 22 for clamping voltage signals on the TIP and RING conductors having a predefined threshold rate of change and at a second predetermined voltage potential above the voice and data signal level and substantially less than the typical ring 170 volts AC ring signal. Voltage clamping circuitry 22 is effective for filtering noise and transient voltage signals occurring below the selected operational voltage of the circuitry 11 and above a predefined threshold rate of change with respect to time above the frequency of the ring signal. Voltage clamping circuitry 22 has a voltage amplitude and frequency response for effectively protecting against transient and noise signals substantially without interfering with the conventional telephone signals. Voltage clamping circuitry 22 provides a common mode voltage signal window by substantially eliminating common mode current flow between the telephone lines so that common mode induced voltages do not produce audible sound in the subscriber's station.

Voltage clamping circuitry 22 includes a diode bridge arrangement 23 of diodes 24, 26, 28 and 30 connected between the resistors 14 and 16 series connected with the TIP and RING conductors. A resistor 32 is connected across the center terminals + and − of diode bridge 23. A capacitor 34 is connected to the junction of the diode bridge—center terminal and resistor 32 and is connected in series with a unipolar voltage suppressor 36 to ground line G. A biasing resistor 38 is connected in parallel with the voltage suppressor 36. A capacitor 40 is connected to the junction of the diode bridge + center terminal and resistor 32 and is connected in series with a unipolar voltage suppressor 42 to ground line G. A biasing resistor 44 is connected in parallel with the voltage suppressor 42.

Various commercially available devices can be used for diodes 24, 26, 28 and 30, such as, for example, a device MDA204G manufactured and sold by Motorola Inc. Voltage suppressors 36 and 42 are selected to have a breakdown voltage rating above the voice and data signals carried by the TIP and RING conductors, such as, for example, in a range between 5 and 10 volts. For example, a device type 1N6269 sold by various manufacturers or General Semiconductor Industries, Inc. part number 1.5KE8.2 and having a breakdown voltage rating of 8.2 volts can be used for unipolar voltage suppressors 36 and 42. The effective frequency response of the overvoltage clamping circuitry 22 for voltage signals above the rated breakdown voltage is determined by the component values of the resistors 14 and 16 and capacitors 34 and 40. Capacitors 34 and 40 may be provided in a range between 0.1 and 1 microfarad with resistors 14 and 16 selected in a range between 10 and 30 ohms. For example, 0.68 microfarad capacitors 34 and 40 can be used with 15 ohm resistors 14 and 16. A high value such as, for example, 10 megohms, is used for resistors 38 and 44 providing a discharge path to ground for capacitors 34 and 40. Similarly a high impedance value such as, for example, 2.2 megohms, is used for resistor 32 providing a discharge path for capacitors 34 and 40.

In operation, positive transient voltage signals on the TIP and RING conductors that exceed both the threshold frequency and the second predetermined voltage potential are coupled via diodes 28 and 30, respectively, capacitor 40 and suppressor 42 to ground. Similarly, negative transient voltage signals on the TIP and RING conductors are coupled via diodes 24 and 26, respectively, capacitor 34 and suppressor 36 to ground. The frequency response of circuit 22 allows the typical 170 volt, low frequency AC ring signal to pass to the subscriber station substantially unaffected. Voice and data signals likewise are substantially unaffected by the overvoltage clamping circuit 22 having an effective impedance of the series impedance of the diodes 24, 26, 28 and 30, capacitors 34 and 40 and the respective parallel combination of the suppressor 36 and resistor 38 and the suppressor 42 and resistor 44.

A common mode voltage signal window is provided by the substantially instantaneous charging of the capacitors 34 and 40 to particular levels determined by the amplitude of the common mode voltage signals on the lines so that the suppressors 36 and 42 are disposed in a non-conductive state. As a result, common mode current flow between the telephone lines is avoided so that common mode induced voltages do not produce audible sound in the subscriber's station.

As an alternative arrangement, a third unipolar voltage suppressor 46 shown in dotted line can be connected between the anode of suppressor 42 and the cathode of suppressor 36 providing voltage clamping therebetween. An identical device type 1N6269 having a breakdown voltage rating of 8.2 volts as used for unipolar voltage suppressors 36 and 42 can be employed for the unipolar voltage suppressor 46.

FIGS. 2-8 illustrate alternative embodiments of overvoltage protection circuits according to the invention generally designated by the reference numerals 50, 52, 54, 56, 58, 60 and 62. The same reference numerals are used for similar circuitry and components of FIG. 1. Each of the overvoltage protection circuits 50, 52, 54, 56, 58, 60 and 62 includes the first overvoltage protection circuitry 11 and an alternative second voltage clamping circuitry that replaces and performs similar functions of the voltage clamping circuitry 22.

Referring now to FIG. 2, the overvoltage protection circuit 50 includes an alternative second voltage clamping circuitry generally designated by the reference numeral 64. Voltage clamping circuitry 64 includes a diode bridge 66 coupled via a pair of capacitors 68 and 70 between the resistors 14 and 16 series connected with the TIP and RING conductors. Diode bridge 66 includes diodes 72, 74, 76 and 78 and can be provided with the same device type as used for diodes 24, 26, 28 and 30. The effective frequency response of the overvoltage clamping circuitry 64 for voltage signals above the rated breakdown voltage is determined by the component values of the resistors 14 and 16 and capacitors 68 and 70. Capacitors 68 and 70 have a similar value as used for capacitor 34 and 40 of FIG. 1.

A unipolar voltage suppressor 80 is connected across the center terminals + and − of diode bridge 66. A bidirectional voltage suppressor 82 is connected in series between the center terminal + of diode bridge 66 and ground G. An identical device type 1N6269 having a breakdown voltage rating of 8.2 volts as used for unipolar voltage suppressors 36 and 42 in FIG. 1 can be employed for the unipolar voltage suppressor 80. A similar device as used for suppressors 18 and 20 having a reverse breakdown voltage rating above the peak common mode voltage signal, such as in a range between 20 volts and 68 volts can be used for bidirectional voltage suppressor 82. For example, a device type 1N6282 sold by various manufacturers or General Semiconductor Industries, Inc. part number 1.5KE39C and having a breakdown voltage rating of 40 volts can be used for bidirectional voltage suppressor 82.

In operation, positive transient voltage signals above the threshold frequency and the second predetermined voltage potential on the TIP and RING conductors are coupled via capacitors 68 and 70, diodes 72 and 74 and suppressor 82 to ground. Similarly, negative transient voltage signals above the threshold second predetermined voltage potential on the TIP and RING conductors are coupled via capacitors 68 and 70, diodes 76 and 78 and suppressors 80 and 82 to ground.

Voltage clamping circuitry 64 provides common mode voltage signal rejection by the operation of the bidirectional suppressor 82. Suppressor 82 is disposed in a non-conductive state with common mode voltage signals on the lines so that common mode current flow is eliminated between the telephone lines and common mode induced voltages do not produce audible sound in the subscriber's station.

Referring now to FIG. 3, the overvoltage protection circuit 52 includes an alternative second voltage clamping circuitry generally designated by the reference numeral 86. Voltage clamping circuitry 86 includes a star arrangement of a pair of unipolar transient voltage suppressors 88 and 90 and a bidirectional voltage suppressor 92. The anode of suppressor 88 is connected to the OUTPUT end of the TIP conductor by a capacitor 94. Similarly, a capacitor 96 connects the suppressor 90 to the RING conductor.

An identical device type 1N6269 having a breakdown voltage rating of 8.2 volts as used for unipolar voltage suppressors 36 and 42 in FIG. 1 can be employed for the unipolar voltage suppressors 88 and 90. A bidirectional suppressor device having a reverse breakdown voltage rating above the peak common mode voltage signal, such as in a range between 20 and 68 volts is used for bidirectional voltage suppressor 92. An identical device type 1N6282 having a breakdown voltage rating of 40 volts as used for bidirectional voltage suppressor 82 can be employed for the bidirectional voltage suppressors 92.

The effective frequency response of the overvoltage clamping circuitry 86 for voltage signals above the rated breakdown voltage of suppressors 88, 90 and 92 is determined by the component values of the resistors 14 and 16 and capacitors 94 and 96. Capacitors 94 and 96 have a similar value as used for capacitor 34 and 40 of FIG. 1.

Voltage clamping circuitry 86 provides a common mode voltage signal window by the operation of the bidirectional suppressor 92. Suppressor 92 is disposed in a non-conductive state with common mode voltage signals on the lines so that common mode current flow is eliminated between the telephone lines and common mode induced voltages do not produce audible sound in the subscriber's station.

Referring now to FIG. 4, the overvoltage protection circuit 54 includes an alternative second voltage clamping circuitry generally designated by the reference numeral 106. Voltage clamping circuitry 106 includes a star arrangement of unipolar transient voltage suppressors 108, 110 and 112 coupled via a pair of capacitors 114 and 116 between the resistors 14 and 16 series connected with the TIP and RING conductors. A diode bridge arrangement 118 of diodes 120, 122, 124 and 126 is connected between the cathode of suppressor 112 and ground G. A unipolar voltage suppressor 128, a capacitor 130 and a resistor 132 are connected in parallel across the center terminals + and − of diode bridge 118.

An identical device type 1N6269 having a breakdown voltage rating of 8.2 volts as used for unipolar voltage suppressors 36 and 42 can be employed for unipolar voltage suppressors 108, 110 and 112. Unipolar voltage suppressor 128 limits the voltage charging level across the capacitor 130 and is selected to have a breakdown voltage rating in a range between 20 volts and 68 volts. A similar unipolar device type 1N6282 having a breakdown voltage rating of 40 volts as used for bidirectional voltage suppressor 82 can be employed for the unipolar voltage suppressors 128.

The effective frequency response of the overvoltage clamping circuitry 106 for voltage signals above the rated breakdown voltage of suppressor 108 and 110 is determined by the component values of the resistors 14 and 16 and capacitors 114 and 116. Capacitors 114 and 116 have a similar value as used for capacitor 34 and 40 of FIG. 1.

In the alternative second voltage clamping circuitry 106, the voltage suppressors 108 and 110 provide a high impedance below the second clamping voltage or 8.2 volts. Voltage clamping circuitry 106 provides a common mode voltage signal rejection by the operation of the parallel connected capacitor 130 and suppressor 128 via the diode bridge 118.

Referring now to FIG. 5, the overvoltage protection circuit 56 includes an alternative second voltage clamping circuitry generally designated by the reference numeral 134. Voltage clamping circuitry 134 includes a bidirectional voltage suppressor 136 coupled via a pair of capacitors 138 and 140 between the resistors 14 and 16 series connected with the TIP and RING conductors. A second bidirectional voltage suppressor 142 is connected between the junction of the the bidirectional voltage suppressor 136 and the capacitors 138 and ground G. Alternatively, the second bidirectional voltage suppressor 142 can connected between the junction of the the bidirectional voltage suppressor 136 and the capacitors 140 and ground G. Voltage clamping circuitry 134 provides a common mode voltage signal window by the operation of the bidirectional suppressor 142.

A similar bidirectional suppressor device type 1N6269 having a breakdown voltage rating of 8.2 volts as used for unipolar voltage suppressors 36 and 42 can be employed for the bidirectional voltage suppressors 136. The bidirectional suppressor device 138 has a reverse breakdown voltage rating above the peak common mode voltage signal, such as in a range between 20 and 68 volts. An identical bidirectional device type 1N6282 having a breakdown voltage rating of 40 volts as used for bidirectional voltage suppressor 82 can be employed for the bidirectional voltage suppressor 142.

Referring now to FIG. 6, the overvoltage protection circuit 58 includes an alternative second voltage clamping circuitry generally designated by the reference numeral 144. Voltage clamping circuitry 144 includes a parallel combination of a first unipolar voltage suppressor 146 connected in series with an oppositely poled diode 148 and a second unipolar voltage suppressor 150 connected in series with an oppositely poled diode 152. The parallel combination of suppressors 146, 150 and diodes 148, 152 is coupled via a pair of capacitors 154 and 156 between the resistors 14 and 16 series connected with the TIP and RING conductors. The suppressors 146, 150 and diodes 148, 152 provides equivalent functions as the bidirectional voltage suppressor 136 of FIG. 5 with an advantage of providing a lower capacitance than suppressor 136. A second low capacitance bidirectional common mode window suppressor function of the bidirectional suppressor 142 of FIG. 5 is provided by a parallel combination of a first unipolar voltage suppressor 158 connected in series with an oppositely poled diode 160 and a second unipolar voltage suppressor 162 connected in series with an oppositely poled diode 164.

An identical device type 1N6269 having a breakdown voltage rating of 8.2 volts as used for unipolar voltage suppressors 36 and 42 of FIG. 1 can be employed for unipolar voltage suppressors 146 and 150. An identical unipolar device type 1N6282 having a breakdown voltage rating of 40 volts as used for the unipolar voltage suppressor 128 of FIG. 4 can be employed for the unipolar voltage suppressors 158 and 162. Diodes 148, 152, 160 and 164 and can be provided with an identical device type as used for diodes forming bridge 23 of FIG. 1.

Referring now to FIG. 7, the overvoltage protection circuit 60 includes an alternative second voltage clamping circuitry generally designated by the reference numeral 166. Voltage clamping circuitry 166 includes a diode bridge 168 coupled via a pair of capacitors 170 and 172 between the resistors 14 and 16 series connected with the TIP and RING conductors. Diode bridge 168 includes diodes 174, 176, 178 and 180 and can be provided with an identical device type as used for diodes forming bridge 23 of FIG. 1. A unipolar voltage suppressor 182 is connected across the center terminals + and − of diode bridge 168. A second diode bridge 184 with a second unipolar voltage suppressor 186 connected across the center terminals + and − of diode bridge is connected in series between the center terminal + of diode bridge 168 and ground G. Diode bridge 184 includes diodes 188, 190, 192 and 194 and can be provided with an identical device type as used for diodes forming bridge 23 of FIG. 1.

An identical device type 1N6269 having a breakdown voltage rating of 8.2 volts as used for unipolar voltage suppressor 80 of FIG. 2 can be employed for unipolar voltage suppressor 182. An identical unipolar device type 1N6282 having a breakdown voltage rating of 40 volts as used for the unipolar voltage suppressor 128 of FIG. 4 can be employed for the unipolar voltage suppressor 186.

Referring now to FIG. 8, the overvoltage protection circuit 62 includes an alternative second voltage clamping circuitry generally designated by the reference numeral 196. Voltage clamping circuitry 196 includes a diode bridge 198 coupled via a pair of capacitors 200 and 202 between the resistors 14 and 16 series connected with the TIP and RING conductors. Diode bridge 198 includes diodes 204, 206, 208 and 210 and can be provided with an identical device type as used for diodes forming bridge 23 of FIG. 1. Instead of the unipolar voltage suppressor 182 of FIG. 7, a plurality of diodes 212, 214, 216, 218, 220 and 222 are connected in series across the center terminals + and − of diode bridge 198. A bidirectional voltage suppressor 224 is connected between the junction of the series connected diodes 216 and 218 and ground G.

The bidirectional suppressor device 224 has a reverse breakdown voltage rating above the peak common mode voltage signal, such as in a range between 20 and 68 volts. An identical bidirectional device type 1N6282 having a breakdown voltage rating of 40 volts as used for bidirectional voltage suppressor 82 of FIG. 2 can be employed for the bidirectional voltage suppressor 224.

In the voltage clamping circuit 11 of FIGS. 1–8, the gas discharge tube 12 can be omitted. In addition, the voltage clamping circuit 11 can be provided without the bidirectional transient voltage suppressors 18 and 20. It should be understood that the gas discharge tube 12 and suppressors 18 and 20 can be eliminated and the protection circuits 10, 50, 52, 54, 56, 58, 60 and 62 remain effective for suppressing noise and transient voltage signals.

Although the present invention has been described in connection with details of the preferred embodiments, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. An overvoltage protection circuit used with a pair of telephone lines comprising:
   first voltage clamping means for clamping voltage signals on said lines at a first predetermined voltage potential,
   second voltage clamping means for clamping voltage signals on said lines at a second predetermined voltage potential, said second voltage clamping means including filter means for filtering noise and transient signals from said voltage signals only when said voltage signals exceed said second predetermined voltage potential,
   said second voltage clamping means including a diode bridge coupled to said lines, a pair of transient voltage suppressor devices, said transient voltage suppressor devices being coupled between a first and second center connection of said diode bridge and ground, and said filter means including resistance means connected in series between said lines and said diode bridge and capacitance means connected between said transient voltage suppressor devices and said diode bridge center connection.

2. An overvoltage protection circuit as recited in claim 1 wherein said transient voltage suppressor devices comprise unidirectional semiconductor devices.

3. An overvoltage protection circuit as recited in claim 1 wherein said second voltage clamping means further include high impedance means connected in parallel with said transient voltage suppressor devices.

4. An overvoltage protection circuit used with a pair of telephone lines comprising:
    first voltage clamping means for clamping voltage signals on said lines at a first predetermined voltage potential,
    second voltage clamping means for clamping voltage signals on said lines at a second predetermined voltage potential, said second voltage clamping means including filter means for filtering noise and transient signals from said voltage signals only when said voltage signals exceed said second predetermined voltage potential,
    said second voltage clamping means including a diode bridge coupled to said lines, a first transient voltage suppressor device coupled between a first and second center connection of said diode bridge, a second voltage suppressor device connected between the second center connection of said diode bridge and ground, and said filter means including resistance means connected in series with said lines and capacitance means connected between a respective one of said resistance means and said diode bridge.

5. An overvoltage protection circuit as recited in claim 4 wherein said second transient voltage suppressor device has a reverse breakdown voltage above a peak value of common mode voltage signals on said lines.

6. An overvoltage protection circuit as recited in claim 4 wherein said first transient voltage suppressor device is a unipolar transient voltage suppressor device formed by a plurality of series connected diodes and said second transient voltage suppressor device is a bidirectional transient voltage suppressor device.

7. An overvoltage protection circuit used with a pair of telephone lines comprising:
    first voltage clamping means for clamping voltage signals on said lines at a first predetermined voltage potential,
    second voltage clamping means for clamping voltage signals on said lines at a second predetermined voltage potential, said second voltage clamping means including filter means for filtering noise and transient signals from said voltage signals only when said voltage signals exceed said second predetermined voltage potential,
    said second voltage clamping means including first and second transient voltage suppressor devices coupled between said lines and a third transient voltage suppressor device connected to a junction of said first and second transient voltage suppressor devices, a diode bridge connected between said third transient voltage suppressor device and ground, a fourth transient voltage suppressor devices connected across first and second diode bridge center connections; and said filter means including resistance means connected in series with said lines and capacitance means connected between said resistance means and said first and second transient voltage suppressor devices.

8. An overvoltage protection circuit as recited in claim 7 wherein said second voltage clamping means further include a capacitor connected in parallel across said fourth transient voltage suppressor device.

9. An overvoltage protection circuit as recited in claim 7 wherein said second voltage clamping means further include high impedance means connected in parallel across said fourth transient voltage suppressor device.

10. An overvoltage protection circuit used with a pair of telephone lines comprising:
    first voltage clamping means for clamping voltage signals on said lines at a first predetermined voltage potential,
    second voltage clamping means for clamping voltage signals on said lines at a second predetermined voltage potential, said second voltage clamping means including filter means for filtering noise and transient signals from said voltage signals only when said voltage signals exceed said second predetermined voltage potential,
    said second voltage clamping means including a first bidirectional transient voltage suppressor device coupled between said lines and a second bidirectional transient voltage suppressor device connected to said first bidirectional transient voltage suppressor device and ground, and filter means including resistance means connected in series with said lines and capacitance means connected between said resistance means and said first transient voltage suppressor device.

11. An overvoltage protection circuit as recited in claim 10 wherein said first and second bidirectional voltage suppressor devices include a pair of unipolar voltage suppressors, each of said unipolar voltage suppressors connected in series with an oppositely poled diode and said series connected unipolar voltage suppressors and diodes connected oppositely poled in parallel.

12. An overvoltage protection circuit used with a pair of telephone lines comprising:
    first voltage clamping means for clamping voltage signals on said lines at a first predetermined voltage potential,
    second voltage clamping means for clamping voltage signals on said lines at a second predetermined voltage potential, said second voltage clamping means including filter means for filtering noise and transient signals from said voltage signals only when said voltage signals exceed said second predetermined voltage potential,
    said second voltage clamping means substantially blocking current flow between said lines responsive to common mode voltage signals on said lines,
    said second voltage clamping means including a first diode bridge coupled to said lines, a first transient voltage suppressor connected between a first and second center connection of said first diode bridge and a second diode bridge coupled between the second center connection of said first diode bridge and ground and a second transient voltage suppressor connected between a first and second center connection of said second diode bridge, and said filter means include resistance means connected in series with said lines and capacitance means connected between said resistance means and said first diode bridge.

13. An overvoltage protection circuit as recited in claim 12 wherein said second transient voltage suppressor device has a reverse breakdown voltage above a peak value of common mode voltage signals on said lines.

* * * * *

UNITED STATES PATENT AND TRADEMARK OFFICE
CERTIFICATE OF CORRECTION

PATENT NO. : 4,941,063
DATED : July 10, 1990
INVENTOR(S) : McCartney et al.

It is certified that error appears in the above-indentified patent and that said Letters Patent is hereby corrected as shown below:

<u>Cover Page</u>   at [*] Notice

"Jul. 19, 2005" should read

--Mar. 02, 2007--

Signed and Sealed this

Twenty-fourth Day of October, 1995

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 4,941,063
DATED : July 10, 1990
INVENTOR(S) : McCartney et al.

It is certified that error appears in the above-indentified patent and that said Letters Patent is hereby corrected as shown below:

<u>Cover Page</u>  at [*] Notice

"Jul. 19, 2005" should read

--Mar. 02, 2007--

Signed and Sealed this

Twenty-fourth Day of October, 1995

Attest:

BRUCE LEHMAN

*Attesting Officer*    *Commissioner of Patents and Trademarks*